US012774739B2

(12) United States Patent
Cariccia et al.

(10) Patent No.: US 12,774,739 B2
(45) Date of Patent: Oct. 27, 2026

(54) FILTERING PULLEY

(71) Applicant: MUVIQ S.R.L., Ivrea (IT)

(72) Inventors: Gianluca Cariccia, San Bernardo d'Ivrea (IT); Andrea Guala, San Bernardo d'Ivrea (IT); Stefano Amadio, San Bernardo d'Ivrea (IT); Jacopo Spinelli, San Bernardo d'Ivrea (IT)

(73) Assignee: MUVIQ S.R.L., Ivrea (IT)

( * ) Notice: Subject to any disclaimer, the term of this patent is extended or adjusted under 35 U.S.C. 154(b) by 0 days.

(21) Appl. No.: 18/994,737

(22) PCT Filed: Jul. 11, 2023

(86) PCT No.: PCT/IB2023/057095
§ 371 (c)(1),
(2) Date: Jan. 15, 2025

(87) PCT Pub. No.: WO2024/018324
PCT Pub. Date: Jan. 25, 2024

(65) Prior Publication Data

US 2026/0016077 A1 Jan. 15, 2026

(30) Foreign Application Priority Data

Jul. 18, 2022 (IT) ........................ 102022000015076

(51) Int. Cl.
*F16H 55/36* (2006.01)
*F16F 15/123* (2006.01)

(52) U.S. Cl.
CPC ........... *F16H 55/36* (2013.01); *F16F 15/123* (2013.01); *F16H 2055/366* (2013.01)

(58) Field of Classification Search
CPC ... F16H 55/36; F16H 2055/366; F16F 15/123
See application file for complete search history.

(56) References Cited

U.S. PATENT DOCUMENTS 10,753,453 B2 * 8/2020 Cariccia ................ F16F 15/123
2018/0045288 A1 * 2/2018 Cariccia .................. F16H 55/36
(Continued)

FOREIGN PATENT DOCUMENTS

CN 108713114 A 10/2018
DE 102020129119 A1 6/2021
(Continued)

OTHER PUBLICATIONS

International Search Report and Written Opinion, Application No. PCT/IB2023/057095, Oct. 10, 2023, 12 pages.

*Primary Examiner* — Minh Truong
*Assistant Examiner* — Mark K Buse
(74) *Attorney, Agent, or Firm* — FisherBroyles, LLP; Susan M. Oiler

(57) ABSTRACT

A filtering pulley has a hub adapted to be fixed to a shaft rotating around an axis (A) and a crown mounted in a rotationally free coaxial way with respect to the hub. The crown has a profile configured to cooperate with a mechanical transmission element, and the hub has a main portion configured to connect the hub to the rotating shaft and an end portion extending axially from a tubular portion thereof. The pulley has a filtering group operatively interposed between the hub and the crown, which has a cup element defining a space, elastic means movably housed inside the space, and actuator means configured to cooperate in contact with the elastic means. The pulley also has a damper integral with the hub. The actuator means and the damper are carried by the end portion of the hub.

20 Claims, 3 Drawing Sheets

(56) References Cited

U.S. PATENT DOCUMENTS

| | | | | |
|---|---|---|---|---|
| 2018/0051792 A1* | 2/2018 | Cariccia | ................ | F16F 15/123 |
| 2020/0141451 A1* | 5/2020 | Cariccia | .................... | F16D 3/12 |
| 2020/0208728 A1* | 7/2020 | Cariccia | .............. | F16F 15/1234 |
| 2024/0255046 A1* | 8/2024 | Cariccia | .................. | F16H 55/36 |

FOREIGN PATENT DOCUMENTS

| | | | |
|---|---|---|---|
| DE | 102021100719 A1 | | 7/2021 |
| WO | WO2017174070 | * | 10/2017 |

* cited by examiner

FILTERING PULLEY

CROSS-REFERENCE TO RELATED APPLICATIONS

The present invention is filed under 35 U.S.C. § 371 as the U.S. National Phase of International Patent Application No. PCT/IB2023/057095, filed Jul. 11, 2023, which designated the United States and which claims the benefit of Italian Patent Application No. 102022000015076, filed on Jul. 18, 2022, the entire disclosure of which is incorporated herein by reference.

TECHNICAL FIELD

The present invention relates to a filtering pulley.

The present invention finds its preferred, although not exclusive, application in a pulley for a crankshaft in an accessory transmission of an internal combustion engine. This application will be referred to hereinafter by way of example.

STATE OF THE PRIOR ART

As is well known, the drive shaft in internal combustion engines is subject to torsional vibrations due to periodic stresses caused by combustion in the cylinders. These vibrations are particularly intense at start-up and at low engine speeds, as well as in the presence of particular construction solutions such as, for example, the use of dual-clutch gearboxes or start-stop systems.

Torsional vibrations result in unevenness in the rotation of the drive pulley of the accessory transmission, which is transmitted to the accessories via the transmission belt, which is therefore subject to periodic tension variations.

In order to "filter" the torsional oscillations transmitted from the crankshaft to the belt, a filtering pulley provided with a hub integral with the drive shaft is generally used as the drive pulley, as well as a crown cooperating with the belt, and one or more elastic elements through which the drive torque is transmitted from the hub to the crown.

An example of construction of a known type of filtering pulley is illustrated in WO2022053097 A1 where the filtering pulley is provided with a vibration damper coupled to a filtering pulley actuator.

This construction is particularly expensive and, above all, affects the effectiveness of the damping of the vibrations acting on the hub.

In addition, this construction is particularly complex, thereby increasing the cost of fitting and therefore of manufacturing the filtering pulley.

The purpose of the present invention is to provide a filtering pulley which solves the above technical problems in a simple and inexpensive way.

SUMMARY OF THE INVENTION

The above purpose is achieved by means of a filtering pulley as claimed by the attached claims.

BRIEF DESCRIPTION OF THE DRAWINGS

For a better understanding of the present invention, a preferred embodiment is described below by way of non-limiting example and with reference to the accompanying drawings, wherein.

DETAILED DESCRIPTION OF THE INVENTION

Figure 1:
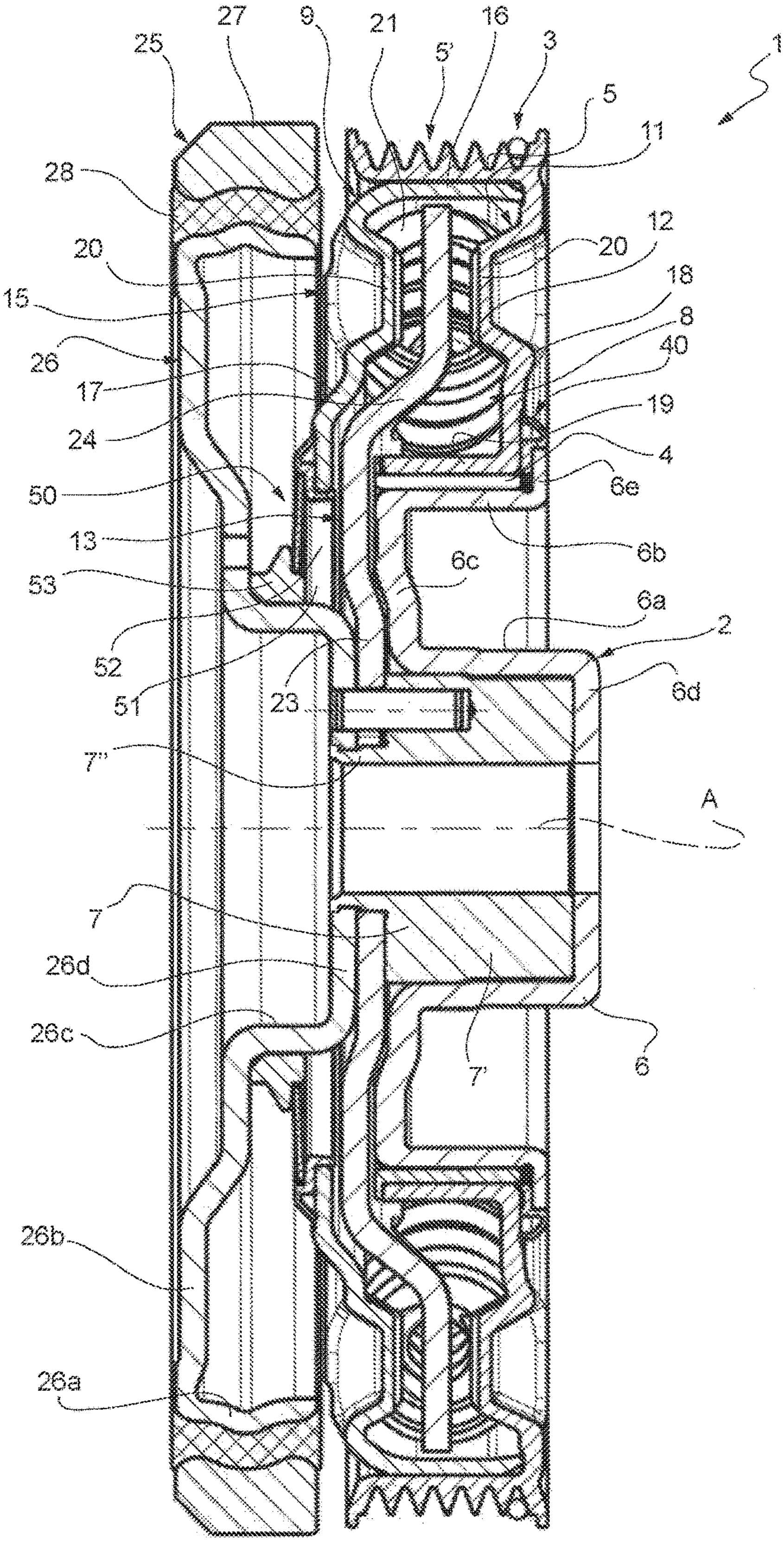
FIG. 1 is a longitudinal sectional view of a filtering pulley according to the invention.

The attached figures show a filtering pulley 1 comprising a hub 2 with an axis A, adapted to be connected to a shaft (not shown), for example a crankshaft of an internal combustion engine, and an annular crown 3 externally coaxial with the hub 2 and supported in a rotationally free way on the hub 2 by support means 4.

In particular, the crown 3 comprises an external annular portion 5 defining an internal radial surface, and an external surface defining at least one profile 5' adapted to cooperate with a mechanical transmission element, such as, for example, a poly-V belt (not shown).

The hub 2 essentially comprises a tubular portion 7 and a flanged portion 6. The tubular portion 7 is configured to allow connection to the rotating shaft while the flanged portion 6 is rigidly carried by the tubular portion 7 and configured to support the crown 3 through the support means 4.

In detail, the flanged portion 6 comprises an inner cylindrical portion *6a* and an outer cylindrical portion *6b* radially spaced apart and connected by a radial portion *6c*. The flanged portion 6 also comprises a lower end portion *6d* and an upper end portion *6e* extending radially from respective ends of the inner and outer cylindrical portions *6a*, *6b* on the side opposite the radial portion *6c*.

The tubular portion 7 essentially comprises a cylindrical main portion 7' cooperating in contact with the inner cylindrical portion *6a* and an end portion 7" described in detail below.

The pulley 1 further comprises a filtering group 8 which is operatively interposed in the radial direction between the crown 3 and the hub 2.

In particular, according to the invention, the filtering group 8 comprises a housing 9 integral with the crown 3 and cooperating in contact with the inner radial surface and defining a space 11, filtering means 12 movably housed inside the space 11, and actuator means 13 configured to cooperate in contact with the filtering means 12 inside the space 11 to selectively transmit torque between the hub 2 and the crown 3.

The housing 9 comprises a cup element 15 comprising an annular wall 16 configured to cooperate in contact with the inner surface of the annular portion 5 of the crown 3, and a radial wall 17 extending cantilevered from one end of the annular portion 16. Advantageously, these walls of the cup element 15 are made in one piece.

The crown 3 further comprises a radial wall 18 extending from the outer annular wall (also referred to herein as the external annular portion 5) on the side opposite the cup element 15, and an inner annular wall 19 extending radially from the inner radial end of the radial wall 18.

The support means 4 mentioned above are advantageously interposed between the inner annular wall 19 of the crown 3 and the outer cylindrical portion *6b* of the flanged portion 6. Advantageously, these support means are made as a bushing, preferably a cylindrical bushing.

The cup element 15 and/or the crown 3 finally comprise two diametrically opposite projections 20 extending axially inside the space 11; in the case described, the projections 20 extend along the axis A from the walls 17 of the cup element 15 and of the crown 3. The projections 20 divide the space 11 into two portions circumferentially delimited by the projections 20 and radially delimited by the walls 17, 18.

The projections 20 are fixedly carried by the respective walls or, alternatively, made in one piece therewith.

As shown, the filtering means 12 comprise at least one elastic group 21 arranged circumferentially free in the respective above-mentioned portions of the space 11.

Each elastic group 21, in the embodiment shown, comprises a spring, advantageously a helical spring, configured to slide in the space 11. In particular, spring-carrying elements can be provided to assist this movement, not further described herein for the sake of brevity.

Advantageously, the actuator means 13 comprise a disc actuator 23, comprising, in the case illustrated, two spokes 24 free to move circumferentially in the space 11 and adapted to interact with the filtering means 12.

Preferably, the stroke of the elastic groups 21 in the respective portions of the space 11 can be given by an angular clearance between each of the elastic groups 21 arranged in contact with one and the other of the projections 20.

Similarly, the spokes 24 can be spaced by an angular clearance in relation to the elastic groups 21, which adds to the above-mentioned angular clearance during the operation of the pulley 1 as described for example in EP3271616 A1 and not reported for the sake of brevity.

The pulley 1 comprises an inertial damper 25 essentially comprising a support element 26 and an inertia ring 27 connected by a damping ring 28, as known per se.

In particular, the support element 26 comprises an outer annular portion 26*a* configured to support, on one side, the damping ring 27, a radial portion 26*b* extending from one end of the outer annular portion 26*a* on the side opposite the crown 3, an inner annular portion 26*c* extending axially on the side opposite the outer annular portion 26*a* from the radial portion 26*b*, and an end portion 26*d* extending radially from one end of the outer annular portion 26*a* on the side opposite the radial portion 26*b*.

Figure 2:
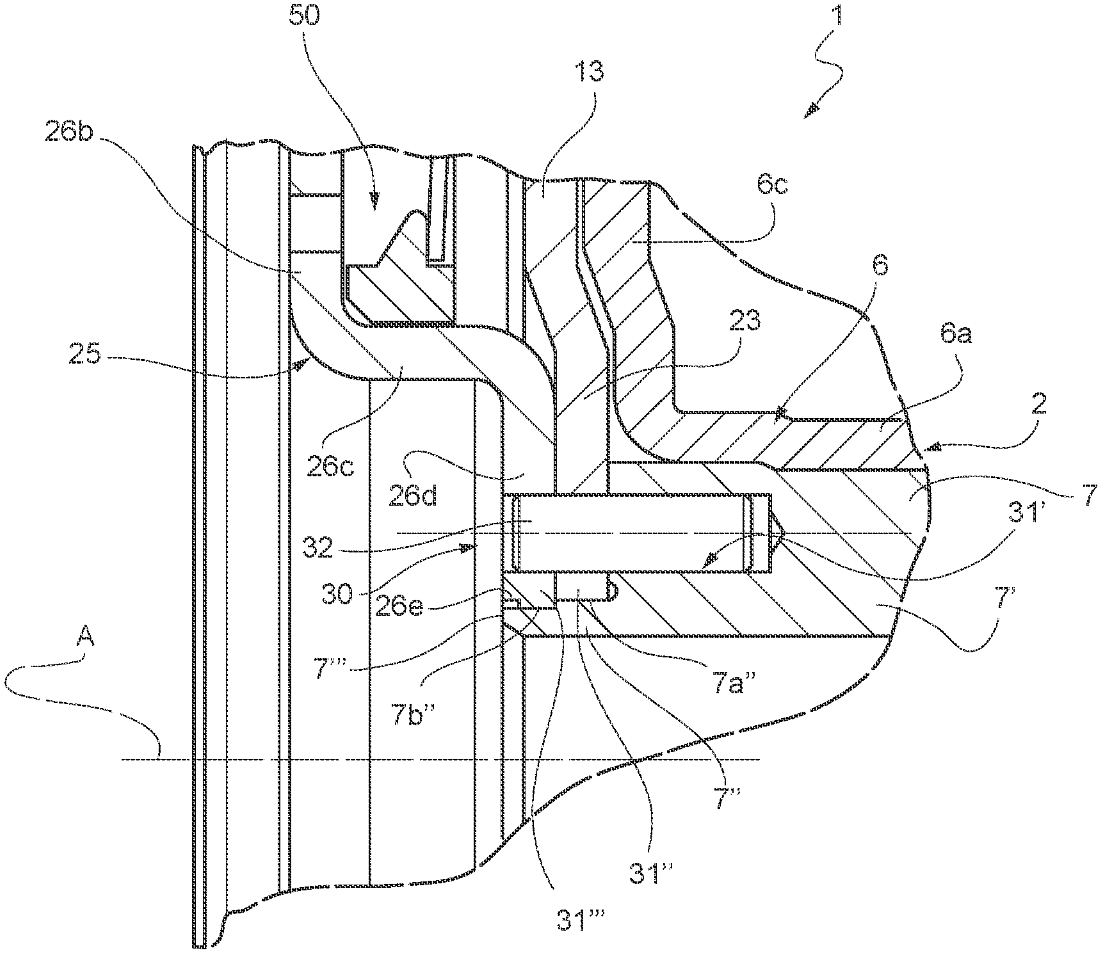
FIG. 2 is an enlarged view of a portion of FIG. 1 at a stage of its manufacture.

As better visible in FIG. 2, the end portion 7" exclusively cooperates in radial contact with the disc 23 and the end wall 26*d* of the damper 25.

In particular, the end portion defines a first radial surface 7*a*" and a second radial surface 7*b*", which are configured to cooperate radially in contact with the actuator means 13, i.e., the disc 23, and the damper 25, i.e., the end wall 26*d*, respectively.

In particular, the first radial surface 7*a*" is located radially farther from the axis A than the second radial surface 7*b*". In greater detail, both radial surfaces are substantially cylindrical and therefore the first radial surface 7*a*" has a greater radius than the radial surface 7*b*". Advantageously, both radial surfaces have a smaller radius than the tubular portion 7' of the hub 2.

The actuator means 13 and the damper 25 are rigidly carried by the tubular portion 7' through a mechanical coupling 30. In particular, the mechanical coupling 30 comprises a pivot element 32, such as a pin, or a threaded element configured to fit into openings 31', 31", 31'" made in the tubular portion 7', in the disc 23 of the actuator means 13, and in the portion 26*d* of the damper 25.

Advantageously, the end portion 7" comprises an appendage portion 7'" which, during machining (FIG. 2), extends axially along the axis A beyond the end portion 7". The appendage portion 7'" is sized to be reshaped within a seat 26*e* defined in an inner radial portion of the end portion 26*d*.

Figure 3:
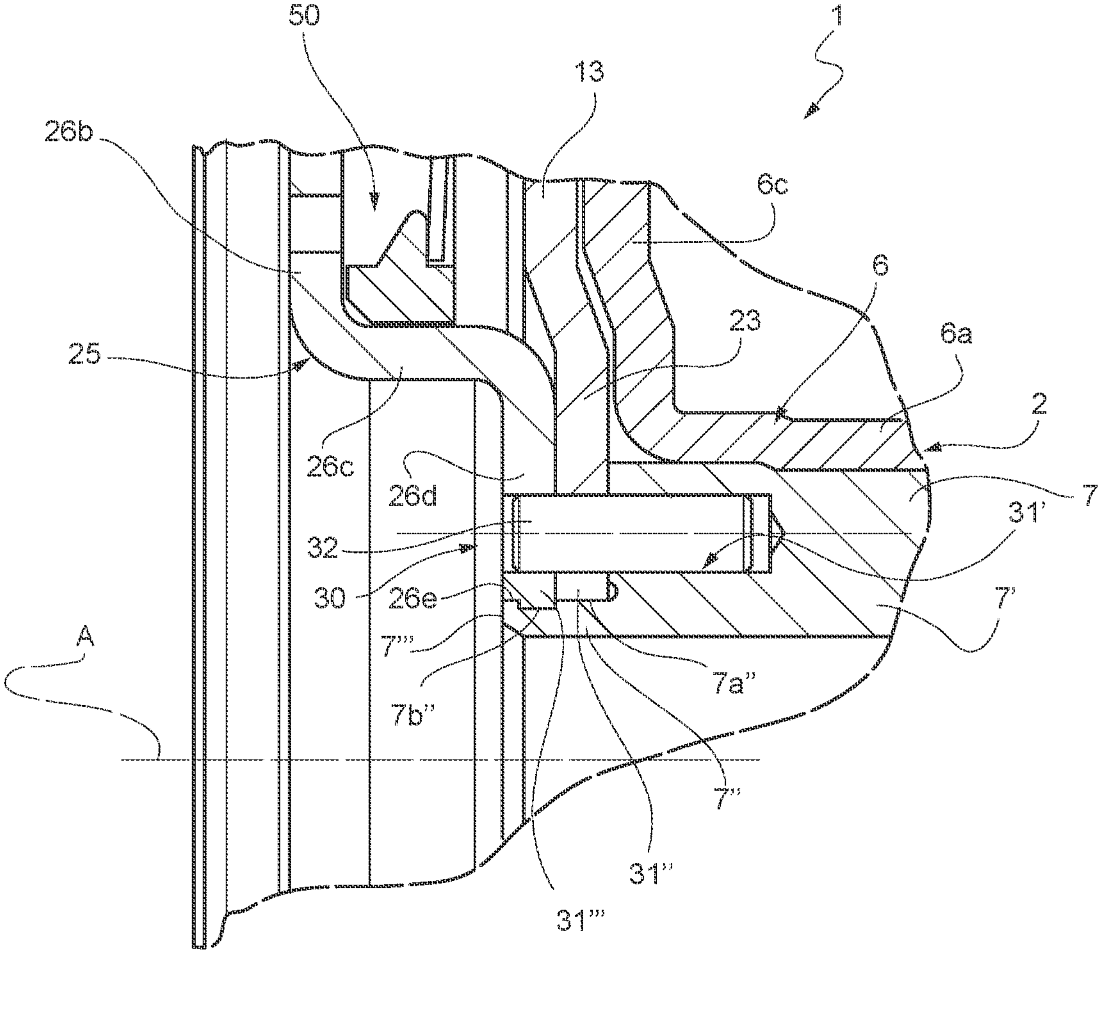
FIG. 3 is an enlarged view of the portion of FIG. 1.

In particular, the appendage portion 7'", once reshaped (FIG. 3), extends within the seat 26*e* in order to further axially keep the support element 26 in contact with the end portion 7" without protruding from the plane defined by the axial surface of the end portion 26*d* of the support element 26.

The pulley 1 further comprises sealing means 40 configured to be operatively interposed between the crown 3 and the hub 2, in particular between the radial wall 18 and the upper end portion 6*e* of the flanged portion 6, to prevent the passage of foreign elements towards the support means 4.

In particular, these sealing means 40 comprise a preferably labyrinthine dust protection lip clamped in the axial direction along the axis A between the aforementioned walls.

On the other side, the pulley 1 comprises sealing and damping means 50 configured to isolate the space 11 and provide an axial force to provide a damping between the hub 2 and the crown 3.

In particular, these sealing and damping means 50 essentially comprise an advantageously labyrinthine dust protection lip 51 cooperating in contact with the lower radial end of the radial wall 17 of the housing 15, and a cup spring 52 interposed between the damper 25 and the dust protection lip 51 in order to keep it in contact with the housing 15.

In particular, the sealing and damping means 50 comprise a support element 53, for example a ring, fitted on the wall 26*c* of the damper 25 and configured to provide support to one end of the cup spring 52 opposite the end cooperating with the dust protection lip 51.

The operation of the pulley 1 according to the invention is described below.

In a first phase of operation, called “driving mode” and constituting the normal operation of the pulley 1, when the drive shaft drags the accessories, the speed of the hub 2 tends to exceed the speed of the crown 3. For this reason, the spokes 24 transmit torque to the projections 20 with the interposition of the respective elastic groups 21.

The above occurs symmetrically in the “overrunning” condition, i.e., when the speed of the crown 3 tends to exceed the speed of the hub 2.

In both operating conditions, the sealing means 40 and 50 damp down the free rotation ensured by the support means 4 between the hub 2 and the crown 3 and prevent dirt from entering the space 11.

This damping is also provided by the passage of oil contained in the space 11 and passing through the elastic groups 21.

If the free angles α, β are present, there will be a free rotation angle between the hub 2 and the crown 3, so no torque is transmitted despite the relative rotation between these two elements. This free rotation angle is the sum of the free angles α, β.

In fact, at first the spoke 31 begins to idle until the elastic groups 21 meet the respective projection 20 so that they begin to compress, transmitting torque.

Therefore, the advantages of a pulley 1 according to the invention are clear.

The end portion 7' of the hub 2 allows easy centering of the actuator means 13 and damper 25, making the assembly easier.

Furthermore, the specific assembly via the mechanical connection 30, in addition to further ensuring correct centering, is particularly compact and robust.

The use of a flanged portion allows the tipping loads acting on the hub to be further reduced as well as it reduces the volume of the space 11, thus allowing the definition of a chamber that keeps the elastic means 21 in motion, preventing them from developing bumps or noises.

Additionally, the appendage portion 7''' reshaped in a seat 26*e* further allows the support element 26 and the actuator 23 to be kept in a package.

Moreover, the use of sealing means 40, 50 allows the contamination of the space 11 to be reduced while providing a damping between the hub and the crown.

In addition, a variable-amplitude angular clearance may be present between the spoke and/or projections and the elastic groups, the angular clearance being configured to provide a dead angle between the hub and the crown of variable amplitude according to the different filtering requirements.

Lastly, it is clear that modifications and variations may be made to the pulley described herein without departing from the scope of protection defined by the claims.

First of all, the pulley could be used not only on the crankshaft of an internal combustion engine but for one of its accessories.

With reference to the elastic group 21, it may be made in different shapes without however changing its function. For example, it may include springs of different nature or multiple springs, either in series or in parallel. Furthermore, the elastic groups could be four, like the spokes of the actuator.

Furthermore, the angular values α, β could be absent or have different amplitudes depending on the dynamic torsional behaviour of the drive shaft in the specific application.

Furthermore, the mechanical connection 30 could be made differently, just as the relative distance between the radial surfaces 7*a*", 7*b*" of the end portion of the hub could be different.

Furthermore, the damper could be of any type, such as a viscous damper.

The invention claimed is:

1. A filtering pulley comprising a hub configured for connection to a shaft rotatable around an axis (A) and a crown mounted in a rotationally free coaxial way with respect to said hub, said crown defining at least one profile configured to cooperate with a mechanical transmission element, said hub comprises a tubular portion and a flanged portion, wherein the tubular portion comprises a main portion configured to connect said hub to said rotating shaft and an end portion extending axially from said main portion;

said pulley comprising a filtering group operatively interposed between said hub and said crown, wherein said filtering group comprises a cup element cooperating with said crown on the side opposite said profile to define a space, elastic means movably housed inside said space and an actuator configured to cooperate in contact with said elastic means, said pulley comprising a damper integral with said hub, said actuator and said damper being carried by said end portion of said hub;

wherein said end portion of the tubular portion of the hub defines a first radial surface configured to cooperate radially in contact with said actuator and a second radial surface configured to cooperate radially in contact with said damper, said first and second radial surfaces being radially offset from each other.

2. The pulley according to claim 1, wherein at least one of said cup element and said crown define a pair of axial projections, said projections dividing said space into two portions within which said elastic means can move under the action of said actuator means.

3. The pulley according to claim 1, wherein said elastic means comprise an elastic group, said elastic group comprising at least one helical spring.

4. The pulley according to claim 1, wherein said actuator comprises a disc and a plurality of spokes extending radially from said disc, said disc being fitted on said first radial surface.

5. The pulley according to claim 4, wherein said damper comprises a support element, an inertia ring and a damping ring connecting said support element and said inertia ring, said support element being fitted on said second radial surface; wherein said support element and said disc are axially in contact with each other along said axis.

6. The pulley according to claim 5, wherein said support element defines a seat facing said end portion, said end portion defining an appendage portion sized to be reshaped inside said seat to keep said support element on said end portion without protruding with respect to said support element along said axis (A).

7. The pulley according to claim 1, wherein said damper comprises a support element, an inertia ring and a damping ring connecting said support element and said inertia ring, said support element being fitted on said second radial surface.

8. The pulley according to claim 1, wherein said second radial surface has a smaller radius than said first radial surface.

9. The pulley according to claim 1, wherein said actuator and said damper are connected to said main portion through a mechanical coupling.

10. The pulley according to claim 9, wherein said mechanical coupling comprises a pin or a threaded element configured to fit into respective holes made in said main portion, said actuator and said damper.

11. The pulley according to claim 1, further comprising a sealing and a damping member operatively interposed between said crown and said damper and configured to isolate said space.

12. The pulley according to claim 11, wherein said sealing and damping member comprise a dust protection lip integral with said cup element, a support element carried by said damper and a cup spring operatively interposed between said dust protection lip and said damper to keep said dust protection lip in contact with said cup element to isolate said from the external environment.

13. The pulley according to claim 1, wherein said hub comprises a flanged portion integral with said main portion operatively connected by support means to said crown.

14. The pulley according to claim 13, wherein said support means comprise a bushing interposed between a portion of said crown and a portion of said flanged portion.

15. The pulley according to claim 13, comprising a sealing ring operatively interposed between said flanged portion and said crown, said sealing ring comprising a dust protection lip configured to isolate said support means from the external environment.

16. The pulley according to claim 13, wherein said flanged portion is fitted on said main portion of said hub.

17. A filtering pulley comprising:

a hub comprising a tubular portion and a flanged portion, wherein the tubular portion comprises a main portion configured to connect the hub to a rotatable shaft and an end portion extending axially from the main portion;

a crown defining at least one profile configured to cooperate with a mechanical transmission element, wherein the crown is mounted to the hub in a rotationally free coaxial way; and a pulley comprising a filtering group operatively interposed between the hub and the crown, wherein the filtering group comprises a cup element cooperating with the crown on the side opposite the profile to define a space, wherein elastic elements are movably housed inside the space and actuator is configured to cooperate in contact with the elastic elements, wherein the pulley comprising a damper integral with the hub;

wherein the actuator and the damper are carried by the end portion of the hub;

wherein the flanged portion of the hub is integral with the main portion of the tubular portion of the hub and the flanged portion is connected by a support member to the crown.

18. The pulley according to claim 17, wherein the support member comprises a bushing interposed between a portion of the crown and a portion of the flanged portion.

19. The pulley according to claim 17, comprising a sealing member operatively interposed between the flanged portion and the crown, the sealing member comprising a dust protection lip configured to isolate the support member from the external environment.

20. The pulley according to claim 17, wherein said flanged portion is fitted on said main portion of said hub.

* * * * *